F. A. HILL.
REGULATOR FOR TURBOCOMPRESSORS.
APPLICATION FILED FEB. 19, 1921.
1,408,700.
Patented Mar. 7, 1922.
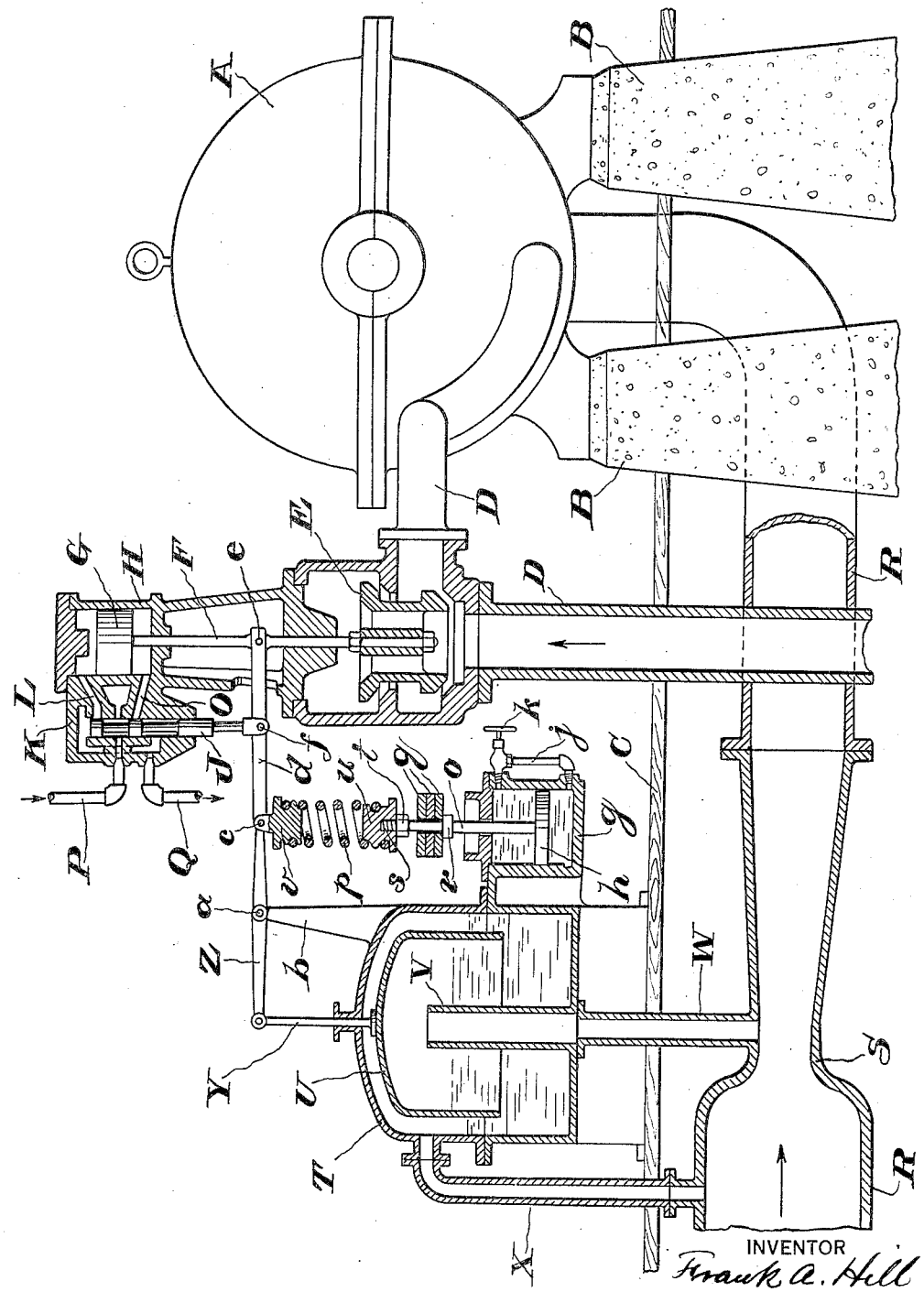
INVENTOR
Frank A. Hill
BY Herbert G. Ogden
his ATTORNEY

UNITED STATES PATENT OFFICE.

FRANK A. HILL, OF PHILLIPSBURG, NEW JERSEY, ASSIGNOR TO INGERSOLL-RAND COMPANY, OF JERSEY CITY, NEW JERSEY, A CORPORATION OF NEW JERSEY.

REGULATOR FOR TURBOCOMPRESSORS.

1,408,700.   Specification of Letters Patent.   Patented Mar. 7, 1922.

Application filed February 19, 1921. Serial No. 446,443.

*To all whom it may concern:*

Be it known that I, FRANK A. HILL, a citizen of the United States, a resident of Phillipsburg, county of Warren, and State of New Jersey, have invented a certain Regulator for Turbocompressors, of which the following is a specification accompanied by drawing.

This invention relates to a regulator for turbo compressors, whether for maintaining constant pressure, suction or volume, but is concerned more particularly with the loading or thrust compensating device for the movable controlling member of such a regulator. A bell shaped float has been found to be a suitable and convenient form of movable member for controlling the power delivered to the motor and is readily adapted to be actuated by fluctuations in the difference in opposed pressures to which the inside and outside of the float may be subjected.

The objects of my invention are to improve upon the loading means for such a bell shaped float, or other regulating member, and enable the pressure, suction or volume, as desired, in the compressor to be held substantially constant except for quick changes in load, for instance, which are compensated for with substantially the same allowable variation usually found in the best spring loaded regulators.

In all speed governors a variation in speed is allowed in order to obtain stability and the isochronous governor although ideal, has been unattainable. The variation allowed from no load to full load is perhaps the most important desideratum of a regulator, and the time required to compensate for this change may be considered the second in importance. Substantially all governors are compromises, different designs assigning different relative weights to these two points. If the governor is made to regulate closely, it is found to be unstable and some form of dash-pot is used to stabilize it, and retard and slow down the motion to compensate for sudden changes of load. On the other hand, if quicker action is sought, the effect of the dash-pot is reduced, and the variation is made larger to prevent hunting or racing.

The reasons for the statements made herein, are based on the following considerations:—

If a body of a finite mass be started in motion, a finite amount of work is required, i. e., a force acting through a given space in the direction of movement. To stop the body, an equal amount of work is necessary, the force acting in the opposite direction. An ordinary spring-loaded centrifugal speed governor may be taken as an example, and let it be assumed that there is no friction in the apparatus. In such case, if the governor is designed to allow a certain variation in speed from no load to full load, there will be only one position in which it can come to rest for a given speed. Any outside influence which disturbs the equilibrium of forces will start it in motion and it will oscillate back and forth like a pendulum, the moment tending to return it increasing as the displacement from the point of equilibrium. If a little friction be introduced, the oscillations will decrease in amplitude in proportion to the amount of work to be done and the governor will come to rest. In this connection, it is important to differentiate between the two forms of friction—namely, solid and fluid. With the former, the forces required to start the governor are greater than those required to keep it in motion, while with the latter the resistance is at all times proportional to the speed. With any speed governor, the parts are in motion and the vibration tends to do away with the starting friction, giving a close approximation to fluid friction. With a pressure or a volume regulator, the solid friction should be reduced to a minimum, and fluid friction introduced.

Considering further the same case as before, namely, a speed governor without friction, and assuming that it is isochronous, it is clear that such a governor can come to rest at any position, but at only one speed. If there is a change in load, steam conditions, or anything which might cause a change of speed, the governor will move and continue in motion until the speed is changed an equal amount in the opposite direction. When the governor reaches this point, it will start back, due to its displacement from the one speed at which it can come to rest. It is apparent that the machine would be raced and the whole process is called hunting. The governor can be made stable by introducing fluid friction or its equivalent, but this would make it slow in its action. Since only a governor of finite mass requires a force to start or stop it, if the mass be assumed as infinitesimal, the governor would come to rest as soon as the proper speed is reached. Even under these ideal, but impossible conditions, the machine would race or hunt unless the time required to change the speed of the machine after a movement of the governor could be made infinitesimal.

The above ideal assumptions have been made and discussed to show the direction to be followed to secure the most satisfactory results.

The primary considerations in designing a governor may be summed up substantially as follows:—

1. The masses of the moving parts should be kept down to a minimum.
2. The solid friction should be small in proportion to the fluid friction.
3. The power of the governor should be high, in order to accomplish the second condition as the solid friction is usually a fixed amount.
4. The lag or anything tending to delay the reaction of the machine to the action of the governor should be a minimum.

As hereinbefore stated, all governors are a compromise upon sensitiveness and speed with stability as a necessary requisite, and I have shown that, by allowing a large enough variation between no load and full load, the dash-pot can be eliminated without racing; and that, with the use of a dash-pot the governor can be made stable even though isochronous. My regulator does not, however, comprise these two most important points, but combines them, for my governor has the absolutely flat top characteristic corresponding to the isochronous speed governor, coupled with the ability to respond to sudden changes of load with the same speed of the undamped governor.

My invention is shown in one of its preferred forms in the accompanying drawing, which is a diagrammatic longitudinal sectional elevation of the apparatus showing the invention.

Referring to the drawings, a turbo compressor A, viewed from the steam end, is shown mounted in the usual manner on the foundations B, the floor line C being indicated for purposes of illustration. Motive fluid, as for instance steam, is admitted from the steam supply pipe D past the admission valve E to the motor of the compressor. This admission valve, which may be of any suitable construction, is actuated in any convenient manner and controlled by a regulator embodying my improvements.

As shown in this instance, the admission valve stem F is provided with the piston G in the cylinder H and a pilot valve J operating in the valve chest K controls the passages L and O leading to the cylinder H. Oil or other fluid is supplied to the pilot valve chest K from the inlet pipe P and the fluid is discharged through the pipe Q.

The intake conduit R of the compressor is preferably provided with a restricted portion, in the form of a Venturi tube S, at which the velocity of the incoming fluid is increased, producing sub-atmospheric pressure, as a Venturi tube has been found to be a convenient device for use in connection with a regulator of the form described.

Within a receptacle T is shown a bell shaped float U subjected to differential pressures, in this instance the regulator being shown connected for constant volume regulation. The inside of the bell shaped float is connected by the conduit V and pipe W to the throat of the Venturi tube S, while the outside of the float is preferably connected by the tube X to the full diametered portion of the intake conduit R, although it is to be understood that under some circumstances the pipe X might be open directly to atmosphere without being connected to the intake conduit R.

The float rod Y is pivoted to one end of the balancing lever Z, which is pivoted at $a$ to the bracket $b$. The other end of the balancing lever Z may be pivotally connected at $e$ to the admission valve stem F. The pilot valve J as shown, is pivoted at $f$ to the pilot lever $d$ so that rocking movement of the balancing lever Z causes the pilot valve J to move up and down.

My improved loading or compensating device comprises a suitable dash-pot $g$ having a plunger $h$ moving in oil and the spaces above and below the plunger are preferably connected by the by-pass $j$ having the controlling valve $k$.

The plunger $h$ is provided with a plunger rod $o$ suitably connected by means of the coiled spring $p$ to the balancing lever $z$, and a dead weight, which may comprise several individual weights $q$, are placed upon the plunger rod $o$ in any suitable manner. The rod $o$ may be provided with a collar $r$ upon which the weights rest. The upper end of the plunger rod may be screw threaded at $s$ and provided with an adjusting nut $t$. A cap $u$ is connected to the upper end of the rod $o$ and the coiled spring $p$ is secured to said cap $u$ at one end. The other end of the spring $p$, as shown, is secured to the cap $v$ pivotally connected at $c$ to the connection between the balancing lever Z and pilot lever $d$.

In the operation of the apparatus, let it be assumed that the compressor is connected to supply a blast furnace with a constant volume of air. The resistance in the furnace to the passage of air varies, and if the resistance increases, the speed of the compressor must increase in order to supply the same quantity of air through the compressor.

If the resistance decreases, the speed must be reduced, to maintain constant quantity of air and prevent too much air from passing.

Upon an increase of resistance in the discharge of the compressor, the velocity head in the intake is lowered, and the increase of pressure in the bell U forces the bell upwardly, pulling the pilot valve J downwardly from the neutral position indicated in the drawing, and admitting fluid pressure under the piston G of the steam inlet valve E, which opens the steam valve still more, increasing the speed of the engine. Upon a decrease of resistance in the discharge of the compressor, the suction in the intake is increased, the bell U is sucked down, and the pilot valve J is pushed up, admitting pressure above the piston G of the inlet valve E, which tends to close the inlet valve and decrease the speed of the engine.

Obviously, by holding the dash-pot plunger $h$ and weights $q$ stationary, the result would be the equivalent of a spring loaded governor. The dash-pot plunger $h$ is however free to move, carrying with it the weights, and the spring $p$ is so designed as to give maximum sensitiveness consistent with stability. The dead weights $q$ maintain a constant tension on the spring $p$ and bring the regulator to rest at substantially exactly the same volume, suction or pressure as desired at all positions of the bell. Although I have only illustrated the invention in connection with a volume regulator, it is to be understood that proper pressure connections may be made to regulate for suction or pressure.

The regulator will hold the suction, pressure or volume constant, except for sudden changes, which are compensated for by changes in the extension of the spring $p$. Changes in suction, pressure or volume, result from such sudden load changes, but these are only temporary and are much less than would result if the regulator were directly connected to the dash-pot and dead weights.

I claim:

1. A regulator for a motor driven turbo compressor, comprising movable means for controlling the power delivered to the motor and actuated by fluctuations in the difference in opposed pressures existing on the two sides of said movable means and a thrust compensating device adapted to be connected to said movable regulating means, comprising a dash-pot having a weighted plunger and a spring connection between said lunger and the said movable regulating means, whereby the spring is maintained under substantially constant tension.

2. A regulator for a motor driven turbo compressor, comprising a movable means for controlling the power delivered to the motor and actuated by fluctuations in the difference in opposed pressures existing on the two sides of said movable means and a thrust compensating device adapted to be connected to said movable regulating means, comprising a dash-pot having a plunger and plunger rod, a dead weight on said rod and a spring connection between said rod and the said movable regulating means, whereby the spring is maintained under substantially constant tension.

3. A regulator for a motor driven turbo compressor, comprising movable means including a balancing lever connected to control the power delivered to the motor and actuated by fluctuations in the difference in opposed pressures existing on the two sides of said movable means and a thrust compensating device for the balancing lever comprising a dash-pot having a weighted plunger, and a spring connection between said plunger and the said balancing lever, whereby the spring is maintained under substantially constant tension.

4. A regulator for a motor driven turbo compressor comprising a receptacle, a bell shaped float in said receptacle for controlling the power delivered to the motor and actuated by fluctuations in the difference in opposed pressures existing inside and outside the float, and a thrust compensating device adapted to be connected to said float comprising a dash-pot having a plunger and plunger rod, a dead weight on said rod and a spring connection between said rod and the said float, whereby the spring is maintained under substantially constant tension.

In testimony whereof I have signed this specification.

FRANK A. HILL.